July 10, 1923.  M. G. MARTIN  1,461,156
CUSPIDOR
Filed April 29, 1920
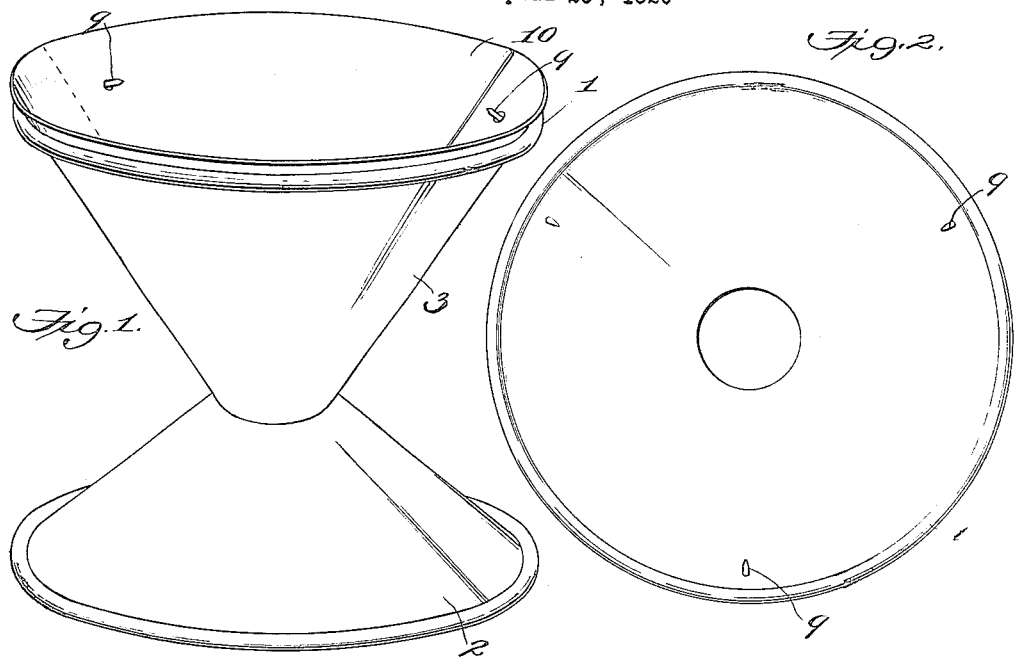
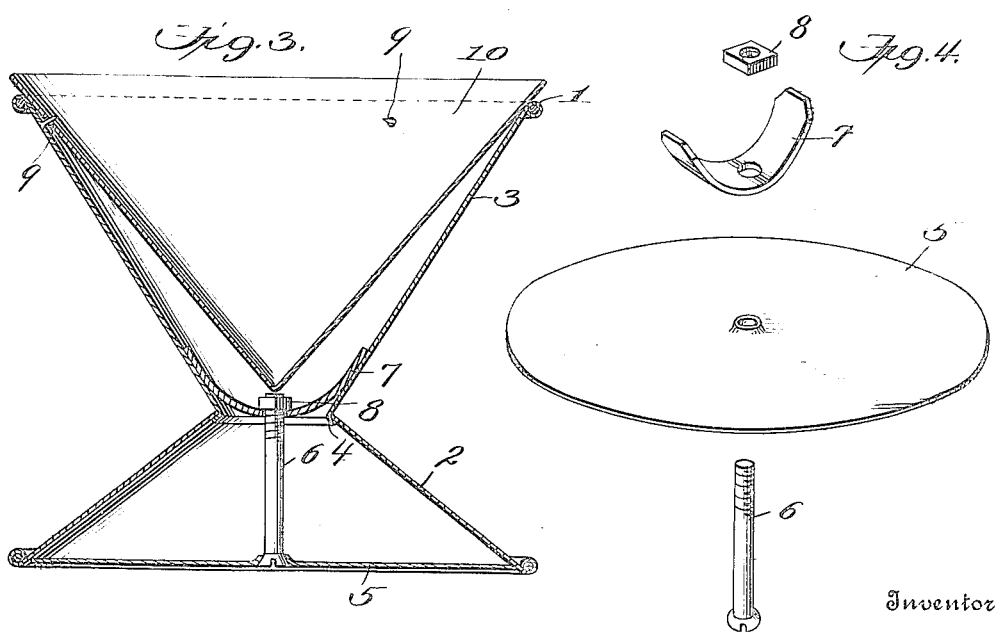
Witness
Inventor
Milton G. Martin
By
Attorney Patented July 10, 1923.

1,461,156

UNITED STATES PATENT OFFICE.

MILTON G. MARTIN, OF STEVENS POINT, WISCONSIN.

CUSPIDOR.

Application filed April 29, 1920. Serial No. 377,557.

*To all whom it may concern:*

Be it known that I, MILTON G. MARTIN, a citizen of the United States, residing at Stevens Point, in the county of Portage and State of Wisconsin, have invented new and useful Improvements in Cuspidors, of which the following is a specification.

This invention relates to an improvement in cuspidors and has for its objects to provide a sanitary device consisting of relatively few parts which shall be neat and pleasing in appearance and which is inexpensive to manufacture and which is adapted for use with sanitary cups or sputum receptacles made of paper or the like in order that said cups or receptacles may be thrown away after use and be replaced by fresh ones.

With the above and other objects in view, my invention consists in certain features of structure, combination and relation which will be more fully set forth hereinafter.

I have illustrated one embodiment of my invention in the accompanying drawings, wherein:

Figure 1 is a perspective view of my improved cuspidor assembled.

Figure 2 is a top plan view of the cuspidor frame or holder.

Figure 3 is a vertical section through the improved cuspidor.

Figure 4 shows the bottom plate and connecting means in detail.

Referring to the drawings wherein similar numerals denote like parts throughout the several views:

I provide a cuspidor body 1, which comprises a holder or base 2 and the upper cone portion 3 which is open at its lower end. These parts are formed separately, and to this end the cone member 3 is provided with an annular flange 4 which seats within the upper aperture of the base.

The bottom of the cuspidor is closed by a plate 5 which is preferably of such size so as to snugly fit within the floor contacting periphery of the base and which acts as a weight to maintain the vessel in an upright position, and the material of which the vessel is made and its size will, of course, depend upon the capacity of the vessel on which it is used. The plate is held in place by means of bolt 6 and spider 7. The latter bears upon the inner walls of the cone 3. A nut 8 threaded on the bolt presses the spider firmly against the walls and maintains the parts of the vessel in connected relation. The upper or cone member 3 is preferably provided with inwardly projecting pins or spurs 9.

The vessel is adapted for use with a sanitary removable cup or sputum receptacle 10 which, when used in connection with a vessel having projecting pins or spurs 9, is shaped to fit within the vessel and may be pressed firmly down thereon and is maintained in position thereby, one of said spurs being forced through the folded portion of said receptacle in order to maintain it substantially flat.

The sanitary cup or sputum receptacle may be made of any suitable material, paper, strawboard or similar substances being preferred, and is impregnated with a solution whereby it is rendered non-inflammable.

It will be understood that in practice the sanitary cups are to be placed within the cuspidor stand or holder and that as often as necessary they may be removed and destroyed, presenting sanitary arrangements which are obvious. Further, the base portion of the cuspidor being in open communication with the upper portion through the opening in the bottom of the conical depression and around said spider, may be readily washed out.

The paper cups being treated so as to render them non-inflammable are adapted for use in public places and, by reason of their construction, obviate danger of fires. By reason of the shape of the cups, they occupy very little space when packed, thereby resulting in substantial economies in storing and shipping as well as in manufacture.

I claim—

In a cuspidor, a hollow stand having an upper wall forming a vessel open at the bottom and adapted to support a removable receptacle, a relatively heavy base plate, said stand having a lower wall surrounding said base plate, a spider in said vessel bearing upon the inner wall thereof and means for supporting said plate from said spider.

In testimony whereof I have hereunto set my hand in presence of two subscribing witnesses.

MILTON G. MARTIN.

Witnesses:
 GEO. B. NILOUM,
 GEORGIA M. ROGERS.